United States Patent Office 3,012,353
Patented Dec. 12, 1961

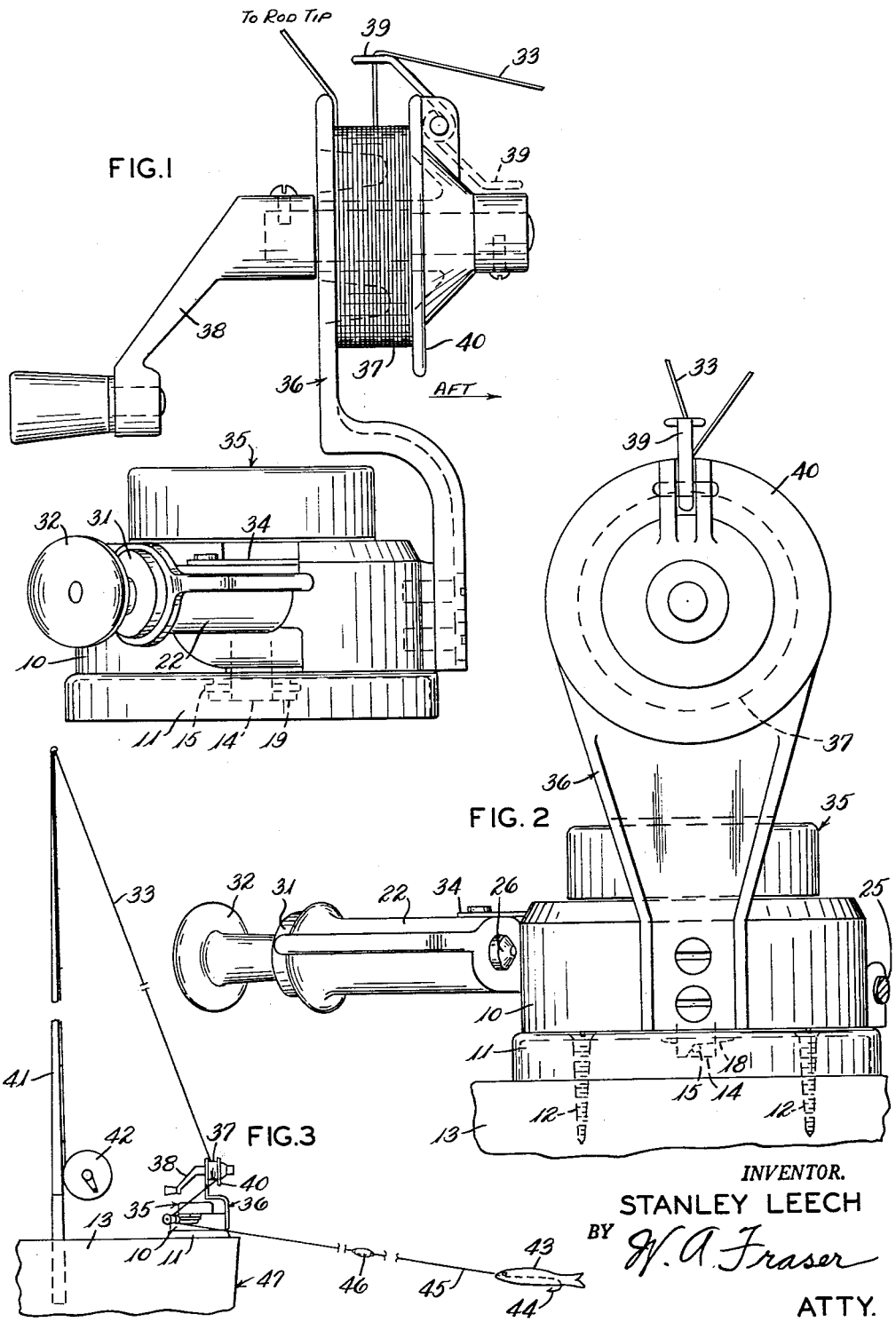

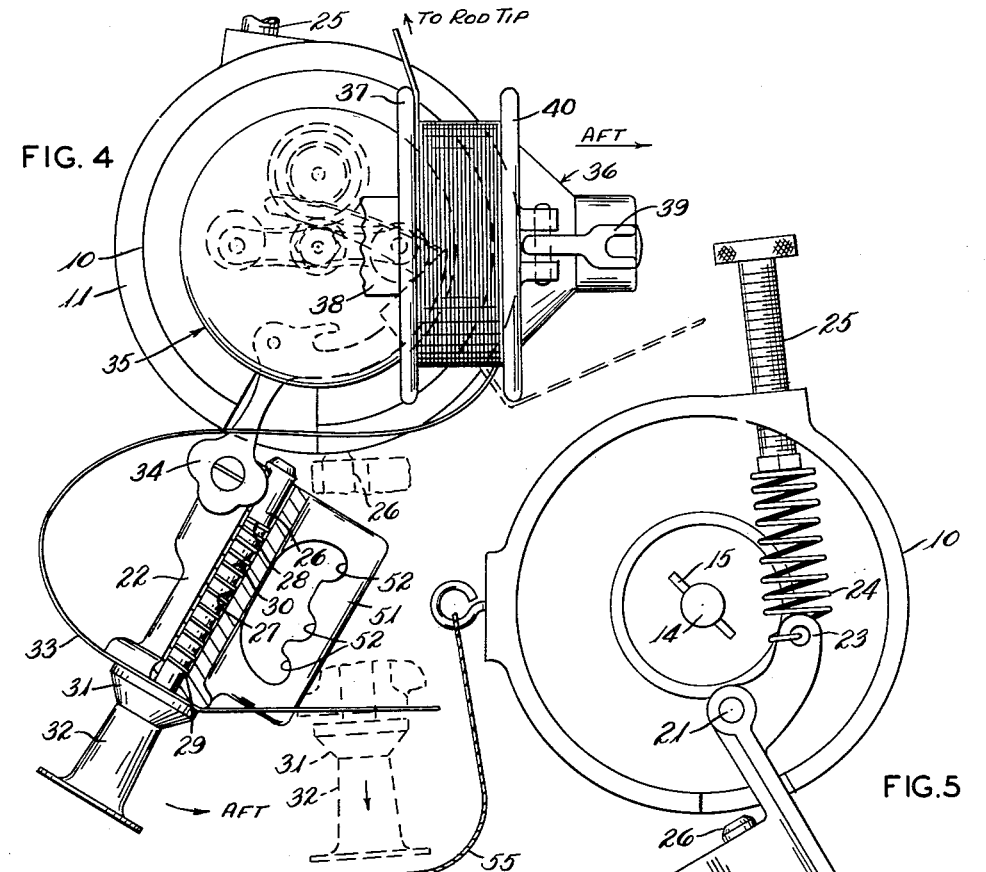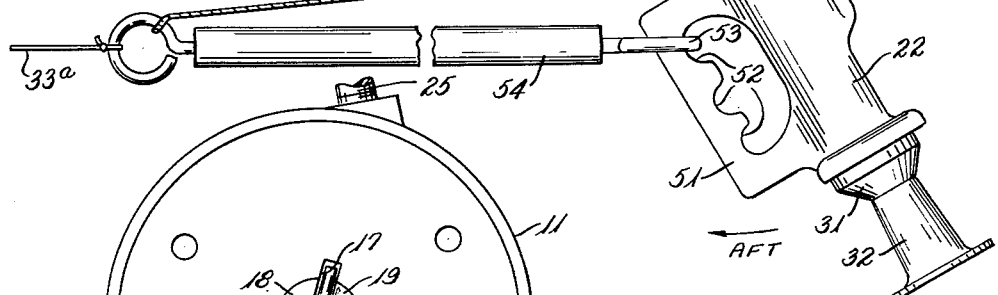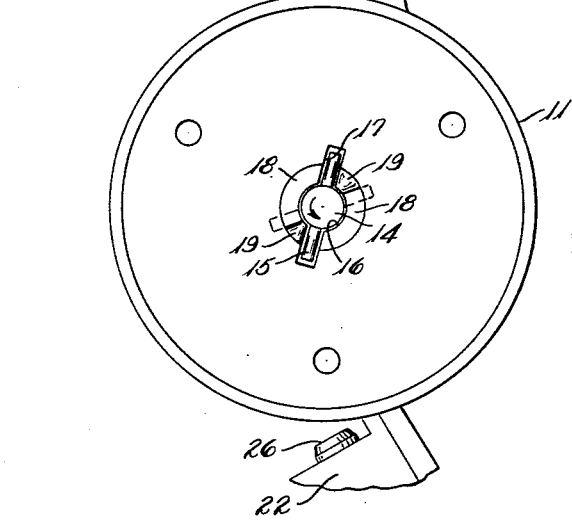

3,012,353
FISHING ALARM WITH RELEASABLE LINE STORING MECHANISM
Stanley Leech, 9211 Midnight Pass Road, Sarasota, Fla.
Filed June 23, 1959, Ser. No. 822,327
12 Claims. (Cl. 43—17)

This invention relates to spring tensioned alarm devices for indicating the presence of a fish caught on a fishing line. The device also serves the purpose of releasing the line, paying out a length of tension-free line leading to a lure which has been struck by a fish, and then permitting the line to be tensioned by a rod and reel when the slack of the payed-out line has been taken up.

It is customary when fishing for swordfish, sailfish or marlin, to troll one or more lines off the back of a powerboat, some of which lines may be attached to outriggers, each of the lines carrying a lure, either artificial or a natural fish or squid, to which is attached a suitable hook or hooks. A quantity of line, for example, from 20 to 30 yards in length, is retained by a releasable device such as a spring clip so that when the lure is struck by the fish, the additional line is released without any tension permitting the lure to remain still for a short period until the slack is taken up and the lure is again trolled at the speed of the boat or the speed of the line being reeled in by the fisherman. It is the nature of fish of this type to strike its prey with the sword or bill to stun the prey which then remains motionless, the swordfish, sailfish or marlin then returning to the stunned prey and devouring it. When this happens on a natural or artificial lure and the fish returns to swallow the lure, the hook is then set by the fisherman putting a virgorous tension on the line, thereby securely hooking the fish.

It is an object of the present invention to provide a spring-tensioned alarm actuated by a lever to which the line, from a conventional rod and reel, is attached, the line running back to the trolled lure. A mechanism on the lever releases the line, whereupon a suitable length of line which has been previously wound on a spin-casting type of reel, is released. The spin-casting reel releases the line without any tension or drag so that the lure will remain motionless, as though stunned, until the fish returns and takes the lure. The forward motion of the boat or the reeling in of the line then again tensions the line and as soon as the pull on the line indicates that the lure has been taken, the fisherman may set the hook, the tension on the line then being taken up by the tip of the rod and the reel. The use of the automatic release and the spin-casting type of device for paying out the line without tension, results in the extra length of line being payed out without fouling or tangling upon itself or upon the rod, boat or outrigger. At the same time, the bell signal provided by the device gives audible notice to the fisherman that the lure has been struck and the line payed out for hooking the fish as soon as the lure is again taken.

A further object of the invention is to provide a spring-tensioned alarm such as a bell or vibrator with an audible sound, which can be used with lures of different weights, as when used for trolling at different depths as well as on the surface. Still another object is to provide a spring-tensioned alarm which will release the line as soon as it is struck, so that the fisherman may immediately begin to play and retrieve a fish which has been hooked, where the fisherman is fishing for species other than the swordfish, sailfish and marlin above mention. In this case, the release of the line permits the tension in the line to be taken up immediately by the tip of the rod and reel. With the foregoing and other objects in view, the device is fully described and claimed in the following description, and illustrated in the accompanying drawings, in which:

FIG. 1 is a side elevation illustrating a device embodying the invention;

FIG. 2 is a corresponding elevation of the device as viewed from the stern of the boat;

FIG. 3 is a somewhat diagrammatical view of the complete rigging of the device of the present invention with a fishing rod and reel, line and lure;

FIG. 4 is a detailed plan view of the device, partly in section, illustrating different positions of the operating mechanism and fishing line;

FIG. 5 is a plan view of the spring-tensioned alarm portion of the device rigged as a hand-line fishing alarm; and FIG. 6 is a detail of the attaching portions of the device for securing same to a boat.

In the device as illustrated in FIGS. 1, 2 and 4, the numeral 10 illustrates a body portion of the device which is removably fastened to a base plate 11 adapted to be fastened by screws or bolts 12 to the deck 13 or side of a boat. A center post 14 on body 10, illustrated in FIG. 6 and indicated by dotted lines in FIG. 1, is provided with a transverse pin 15 near its end. The post 14 and pin 15 are adapted to pass through an aperture 16 and a slot 17 in the base plate 11. A rotary motion of body 10 rotates post 14 and pin 15, the latter contacting a pair of inclined cam surfaces 18 for securely locking body 10 to base plate 11 when the body is rotated in the direction as it would be when the tension of a fish on a line pulls on the lever device described below. The body 11 of the device may be released by rotating same in the opposite direction until the pin 15 is again aligned with slot 17, whereupon post 14 may be withdrawn from base plate 11. Projections 19 may be provided on base plate 11 adjacent aperture 16 and cam surfaces 18 to serve as a positive stop for pin 15.

FIG. 5 illustrates the body 10 of the device with the base plate 11 removed and shows the internal mechanism next to be described. FIG. 6 shows the underside of the base plate 11 secured to the body 10 by center post 14 and pin 15.

Referring again to FIGS. 1, 2, 4, and 5, pivoted at 21 within housing 10 is a lever 22 engaged at its end 23 by coil spring 24, the other end of which is fastened to a tension adjusting screw 25 threaded into housing 10. The other end of lever 22 is provided with a spring tensioned plunger 26, reciprocably mounted within a bore 27. Interposed between a shoulder 28 on plunger 26 and a shoulder 29 adjacent the outer end of bore 27, is a compression spring 30 arranged to force plunger 26 radially toward housing 10. A flange 31 on knob 32 attached to the outer end of plunger 26 is forcibly held against the outer end of lever 22 by such spring action. As will be later explained, a fishing line 33 may be held between flange 31 and the end of lever 22 by the pressure of spring 30, so that a pull on line 33, as by a fish being caught on the line, will actuate lever 22 against the tension of spring 24. This motion actuates the operating lever 34 of an ordinary bicycle type bell 35 mounted on housing 10 to ring the bell when a fish strikes. As lever 22 begins to approach the end of its stroke, the inner end of plunger 26 will contact the side of housing 10 or a suitable abutment on the device, forcing the plunger outwardly against the spring 30 to release the pressure of flange 31 to free line 33. On the return stroke the bell will ring again.

Also mounted on housing 10 is a spin type reel 36, as shown in FIGS. 1, 2 and 4, adapted to hold a length of line to be freed without tension when the equipment is used for catching swordfish, sailfish or marlin. The spool 37 of this reel remains stationary while a length of line is wound on the spool by rotating handle 38 which in turn rotates a guide 39 pivoted to a flange 40 rotatable by handle 38 to guide the fishing line on the spool. When a sufficient length of line is wound on the reel 36, guide 39 is flipped to the inoperative position indicated in dotted lines in FIG. 1, and the line released from the guide is clamped under flange 31 as above described.

In setting the line for sailfishing, for example, the arrangement illustrated in FIG. 3, is followed. A sailfishing rod 41 having thereon a reel 42 is used to hold fishing line 33 and to play and retrieve the fish. A suitable length of line is let off of reel 42, approximately 30 to 50 yards more than the customary distance of the lure trolled behind the boat. An artificial lure or live bait 43 is affixed to a hook 44 at the end of the fish line 33. Usually a wire leader 45 may be used for attaching the bait and hook to the end of the line and for certain types of fishing, a sinker 46 may be interposed between the line and the leader. The rod handle is then placed in a socket (not shown) on the side of the boat 47, as customarily used to hold a fishing rod while trolling. The let-out line is then started around reel 37 and handle 38 is rotated to wind a suitable length of line onto reel 37 by means of guide 39, as above described. Guide 39 is then flipped out of operative position, and the line leading to the bait is clamped under flange 31 on lever 22. From this point the line and lure are then trolled behind the boat in the usual manner. When a sailfish strikes the lure or bait, the added tension on the line pulls lever 22 in the "Aft" direction indicated in FIG. 4, to the position shown in dotted lines, FIG. 4, ringing bell 35, engaging plunger 26 with the side of the housing, and releasing line 33 from under flange 31. This permits lever 22 to return to its original position, again ringing bell 35. The release of line 33 allows it to be pulled axially off of spool 37 (dotted line position, FIG. 4) without any drag or tension so that the bait will remain motionless to be taken by the fish. Meanwhile, after hearing the bell alarm, the fisherman takes up the rod, and when a jerk on the rod tip indicates that the fish has taken the bait, he sets the hook by a strong pull on the rod, then plays and retrieves the fish in the usual manner. The use of the bell alarm and releasable line storage mechanism advises the fishman that a fish has struck and lets out the stored line without drag and without danger of tangling or fouling of the line. At the same time, it does not interfere with the sport of playing and retrieving the fish, since the rod, reel and line are then entirely free of the alarm and releasable line storage mechanism.

The alarm and line release may be used for rod and reel fishing for other types of fish than the spearfish family, by trolling with the line from the bait clamped under flange 31 as above, but then running directly to the rod. This manner of rigging is employed on fish which take the bait immediately. As soon as the fish strikes, the bell is rung and the line is released so that the fish may then be played and retrieved with the rod and reel.

The alarm mechanism may also be used for hand line fishing. In this case, FIG. 5, a bail 51 affixed to the side of lever 22 is provided with a plurality of notches 52, 52 in which is interchangeably secured a hook or eye 53, attached to a rubber or metallic spring 54, the other end of which is fastened to the fishing line 33a. A short cable 55 may also be attached to the fishing line and to the housing 10 as illustrated to check excessive tension on spring 54 to prevent its overstretching. The eye 53 is placed in the innermost notch 52 when a heavy sinker is employed on the line for deep trolling, while the center notch 52 is used with a medium weight sinker on the line and the outermost notch 52 is used for a line carrying a light weight sinker or no sinker for surface trolling or for still fishing from a boat or dock. The remainder of the bell alarm structure is the same as that described in connection with FIG. 1 and the bell alarm is sounded in the same way when a fish on the line pulls on lever 22.

It will be seen that a simple and effective design of fishing equipment has been provided for a fishing alarm with releasable line storage mechanism which will operate without fouling the line or interfering with the sport of playing or landing the fish. The device is useful particularly in the field of fishing for swordfish, sailfish or marlin, but may be used for trolling for other types of fish with a rod and reel, where the pull of a fish on the line effects automatic release of the line, operating the alarm, and freeing from the alarm device the line extending from the rod and reel to the lure. The alarm itself is also useful for handline trolling with different weights of lures and sinkers or for still fishing. The device therefore has universal appeal for all types of trolling or for still fishing.

I claim:

1. A fishing alarm with releasable line storing mechanism for fishing with a rod and reel and a trolled line and bait or lure attached to said line, comprising a housing adapted to be attached to a boat or an outrigger projecting from a boat, a spring tensioned lever pivoted on said housing to swing in a fore and aft direction with respect to the boat and adapted to be actuated against its spring tension by the pull of a fish striking said lure on said line, said lever being formed with a bore, a plunger slideable in said bore and a spring for urging said plunger toward said housing, a knob on the outer end of said plunger adapted to be urged by the spring pressure on the plunger to be resiliently clamped against the end of said lever, whereby said fishing line may be clamped between said knob and the end of the lever and may be tightly held by the plunger spring pressure against the normal tension on the fishing line during the trolling of said lure attached to said line, the arrangement of the pivoted lever with respect to the housing being such that the swinging motion of the pivoted lever will bring the radially inner end of the plunger into forcible contact with an abutment on the housing to push in the plunger against the action of the spring thereby pushing said knob out of clamping engagement with the fishing line to release same when the additional tension resulting from a fish striking the lure causes such swinging motion of the pivoted lever, an alarm bell associated with said housing and lever for giving a signal upon said fore and aft swinging of the lever, a line storage device associated with said housing for holding a length of line extending between said line clamping knob and said fishing rod, said line storage device having a stationary spool and a handle and guide for winding and guiding said length of line onto said spool, the guide being adapted to be placed into inoperative position so that said line may thereupon be withdrawn axially from said spool in the manner of spin casting, whereby the line may be released from said storage device without any drag or tension when a fish strikes the lure and the line clamping lever releases the line leading to the lure, permitting the lure to remain motionless so that the fish may swallow same thereby allowing the hook to be set so the fish may be played and retrieved with the line free of said alarm device.

2. A fishing alarm for fishing with a rod and reel and a trolled line and bait or lure attached to said line, comprising a housing adapted to be attached to a boat or an outrigger projecting from the boat, a spring tensioned lever pivoted on said housing to swing in a fore and aft direction in relation to the direction of travel of the boat, means for adjusting the spring tension on said lever, so that the lever will be held without moving during the normal trolling of the lure, but will be actuated against its spring tension by the pull of a fish striking said lure on said line, an alarm bell associated with said housing and lever for producing a signal upon said fore and aft swinging motion of the lever, said lever being formed with a bore extending radially with respect to the pivot of said lever, a plunger slideable in said bore and a spring for urging said plunger toward said housing, an abutment on the radially outer end of said plunger adapted to be urged by the spring on said plunger for resiliently clamping said fishing line against the end of said lever, whereby said fishing line may be tightly held by the plunger spring pressure against the normal tension on the fishing line during the trolling of said lure attached to said line, the arrangement of the pivoted lever with respect to the housing being such that the swinging motion of the pivoted lever will bring the radially inner end of the plunger into forceable contact with the housing to push in the plunger against the action of the spring, thereby forcing said line clamping abutment out of clamping engagement with the fishing line to release same when the additional tension resulting from a fish striking the lure causes such swinging motion of the pivoted lever, a line storage device associated with said housing for holding a length of line extending between said line clamping abutment and said fishing rod, said line storage device having a stationary spool and a rotatable handle and pivoted guide rotatable by said handle for winding and guiding said length of line onto said spool, the guide being adapted to be pivoted into inoperative position so that said line may be withdrawn axially from said spool in the manner of spin casting, whereby the line may be released from said storage device without any drag or tension when a fish strikes the lure and the line clamping lever releases the line leading to the lure, permitting the lure to remain motionless so that the fish may swallow same, thereby allowing the hook to be set so that the fish may be played and retrieved with the line free of said alarm and line storing mechanism.

3. A fishing alarm with releasable line storing mechanism for fishing on a boat with a rod and reel and a trolled line and bait or lure attached to said line, comprising means for attaching said alarm and storing mechanism to said boat, a spring tensioned lever pivoted to said attaching means for swinging in a fore and aft direction in relation to the direction of travel of said boat, a plunger slideably mounted on said lever, a knob on the outer end of said plunger, a spring on said lever adapted to urge said plunger radially inwardly to bring said knob into spring pressed contact with a stop on said lever, whereby a loop of said fishing line may be inserted between the knob and stop member to be held by spring pressure so that the lever will be swung by the added tension of said trolled line on said lever when a fish strikes the lure, an abutment on said lever for engaging the radially inner end of said plunger when said lever is actuated in an aft direction by the pull of a fish on said line, an alarm bell associated with said lever for producing a signal upon said swinging of the lever, a line storage device associated with said lever and line clamping mechanism for holding a length of line extending between said line clamping knob and the fishing rod, the line storage device having a stationary spool, winding, guiding and letoff mechanism for winding said line on said spool and releasing said line from said spool in an axial direction without drag, in the manner of spin casting, whereby the line may be released from said storage device without any drag or tension when a fish strikes the lure and the line clamping mechanism releases the line leading to the lure, permitting the lure to remain motionless so that the fish may swallow same thereby allowing the hook to be set so the fish may be played and retrieved with the line free of said alarm and line storing mechanism.

4. A fishing alarm for fishing with a rod and reel and a trolled line and bait or lure attached to said line, comprising a housing adapted to be attached to a boat or an outrigger projecting from the boat, a spring tensioned lever pivoted on said housing to swing in a fore and aft direction in relation to the direction of travel of the boat, means for adjusting the spring tension on said lever, so that the lever will be held without moving during the normal trolling of the lure, but will be actuated against its spring tension by the pull of a fish striking said lure on said line, an alarm bell associated with said housing and lever for producing a signal upon said fore and aft swinging motion of the lever, said lever being formed with a bore, a plunger slideable in said bore and a spring for urging said plunger toward said housing, a knob on the outer end of said plunger adapted to be urged by the spring pressure on the plunger for resiliently clamping said fishing line against the end of said lever, whereby said fishing line may be tightly held by the plunger spring pressure against the normal tension on the fishing line during the trolling of said lure attached to said line, the arrangement of the pivoted lever with respect to the housing being such that the swinging motion of the pivoted lever will bring the radially inner end of the plunger into forcible contact with an abutment on the housing to push in the plunger against the action of the plunger spring thereby forcing said knob out of clamping engagement with the fishing line to release same when the additional tension resulting from a fish striking the lure causes such swinging motion of the pivoted lever, whereby the line to the rod and reel, and to the lure may be released as the alarm is sounded, so that the fish may be retrieved and landed with the line free of said alarm device.

5. A fishing alarm for fishing with a rod and reel and a trolled line and bait or lure attached to said line, comprising a housing adapted to be attached to a boat or an outrigger projecting from the boat, a spring tensioned lever pivoted to said housing to swing in a fore and aft direction in relation to the direction of travel of the boat, means for adjusting the spring tension on said lever, so that the lever will be held without moving during the normal trolling of the lure, but will be actuated against its spring tension by the pull of a fish striking said lure on said line, an alarm bell associated with said housing and lever for producing a signal upon said fore and aft swinging motion of the lever, said lever being formed with a bore extending radially with respect to the pivot of said lever, a plunger slideable in said bore and a spring for urging said plunger toward said housing, an abutment on the radially outer end of said plunger adapted to be urged by the spring on said plunger for resiliently clamping said fishing line against the end of said lever, whereby said fishing line may be tightly held by the plunger spring pressure against the normal tension on the fishing line during the trolling of said lure attached to said line, the arrangement of the pivoted lever with respect to the housing being such that the swinging motion of the pivoted lever will bring the radially inner end of the plunger into forceable contact with the housing to push in the plunger against the action of the spring, thereby forcing said line clamping abutment out of clamping engagement with the fishing line to release same when the additional tension resulting from a fish striking the lure causes such swinging motion of the pivoted lever, so that when the bell alarm is sounded, the fish may be played and retrieved with the line free of said mechanism.

6. A fishing alarm for fishing on a boat with a rod and reel and a trolled line and bait or lure attached to said line, comprising means for attaching said alarm to said boat, a spring tensioned lever pivoted to said attaching means for swinging in a fore and aft direction in relation to the direction of travel of said boat, a plunger slideably mounted on said lever, an abutment on said plunger, a spring on said lever adapted to urge said plunger radially inwardly to bring said abutment radially into spring pressed contact with a stop on said lever, whereby a loop of said fishing line may be inserted between the abutment and stop member to be held by spring pressure so that the lever will be swung by the added tension of said trolled line on said lever when a fish strikes the lure, means for engaging the radially inner end of said plunger when said lever is actuated in an aft direction by the pull of a fish on said line for pushing said plunger radially outwardly to force said abutment out of contact with said stop to release said loop of line, an alarm bell associated with said lever for producing a signal upon said swinging of the lever, whereby when a fish strikes the lure actuating the lever and ringing the bell alarm, the line clamping mechanism releases the line leading from the lure to the rod and reel so that the fish may be played and retrieved with the line free of said alarm and line storing mechanism.

7. A release mechanism for fishing with a rod and reel and a trolled line and bait or lure attached to said line, comprising a housing adapted to be attached to a boat or an outrigger projecting from the boat, a spring tensioned lever pivoted to said housing to swing in a fore and aft direction in relation to the direction of travel of the boat, means for adjusting the spring tension on said lever, so that the lever will be held without moving during the normal trolling of the lure, but will be actuated against its spring tension by the pull of a fish striking said lure on said line, said lever being formed with a bore, a plunger slideable in said bore and a spring for urging said plunger toward said housing, a knob on the outer end of said plunger adapted to be urged by the spring pressure on the plunger for resiliently clamping said fishing line against the end of said lever, whereby said fishing line may be tightly held by the plunger spring pressure against the normal tension on the fishing line during the trolling of said lure attached to said line, the arrangement of the pivoted lever with respect to the housing being such that the swinging motion of the pivoted lever will bring the radially inner end of the plunger into forcible contact with an abutment on the housing to push in the plunger against the action of the plunger spring thereby forcing said knob out of clamping engagement with the fishing line to release same when the additional tension resulting from a fish striking the lure causes such swinging motion of the pivoted lever, whereby the line to the rod and reel, and to the lure may be released so that the fish may be retrieved and landed with the line free of said mechanism.

8. A release mechanism for fishing with a rod and reel and a trolled line and bait or lure attached to said line, comprising a housing adapted to be attached to a boat or an outrigger projecting from the boat, a spring tensioned lever pivoted to said housing to swing in a fore and aft direction in relation to the direction of travel of the boat, means for adjusting the spring tension on said lever, so that the lever will be held without moving during the normal trolling of the lure, but will be actuated against its spring tension by the pull of a fish striking said lure on said line, said lever being formed with a bore extending radially with respect to the pivot of said lever, a plunger slideable in said bore and a spring for urging said plunger toward said housing, an abutment on the radially outer end of said plunger adapted to be urged by the spring on said plunger for resiliently clamping said fishing line against the end of said lever, whereby said fishing line may be tightly held by the plunger spring pressure against the normal tension on the fishing line during the trolling of said lure attached to said line, the arrangement of the pivoted lever with respect to the housing being such that the swinging motion of the pivoted lever will bring the radially inner end of the plunger into forceable contact with the housing to push in the plunger against the action of the spring, thereby forcing said line clamping abutment out of clamping engagement with the fishing line to release same when the additional tension resulting from a fish striking the lure causes such swinging motion of the pivoted lever, so that the fish may be played and retrieved with the line free of said mechanism.

9. A release mechanism for fishing with a rod, reel, line and bait or lure attached to said line, comprising a spring tensioned lever formed with a bore and pivoted to said housing for swinging with a fore and aft motion, a plunger slideably mounted in said bore in said lever, an abutment on the radially outer end of said plunger, a spring in said bore in said lever adapted to urge said plunger radially inwardly to bring said abutment into spring pressed contact with a stop on said lever, whereby a loop of said fishing line between the lure and the tip of the rod, may be inserted between the abutment and stop member to be held by spring pressure so that the lever will be swung by the added tension of said line on said lever when a fish strikes the lure, means for engaging the radially inner end of said plunger when said lever is actuated in an aft direction by the pull of a fish on said line, whereby when a fish strikes the lure actuating the lever, the line clamping mechanism releases the line leading from the lure to the tip of the rod and then to the reel so that the fish may be played with the rod and retrieved with the line free of said release mechanism.

10. A fishing alarm for use with a fishing line, sinker, and bait or lure, comprising a housing adapted to be attached to a boat or an outrigger projecting from a boat, a spring tensioned lever pivoted on said housing to swing in a fore and aft direction with respect to the boat and adapted to be actuated against its spring tension by the pull of a fish striking said lure on said line, an alarm bell associated with said housing and lever for giving a signal upon said fore and aft swinging of the lever, means on said lever for attaching said line to said lever selectively in a plurality of positions radially inwardly or outwardly with respect to the pivot of said lever, whereby the lever arm length at the point of attachment may be shortened when a heavy sinker is used for deep fishing and the lever arm length may be lengthened when a light sinker or surface lure is used for surface fishing, the use of the different points of attachment providing a more uniform moment of force on said lever regardless of weight of the lure or sinker.

11. A fishing alarm for use in trolling with a fishing line, sinker and bait or lure, comprising a housing adapted to be attached to a boat or an outrigger projecting from the boat, a lever pivotally associated with said housing, a spring and spring-tensioning means connected to said lever, said spring tensioning means being adjustable to resist the pull of a normally trolled lure and to permit the lever to swing in a fore and aft direction with respect to the boat by the pull of a fish striking said lure on said line, an alarm bell associated with said housing and lever for producing a signal during said fore and aft swinging of the lever, notches spaced along said lever at radially spaced positions for attaching said line to said lever selectively in a plurality of positions radially inwardly or outwardly with respect to the pivot of said lever whereby the lever arm length at the point of attachment may be shortened when a heavy sinker is used for deep fishing and the lever arm length may be lengthened when a light sinker or surface lure is used for surface fishing, the use of the different points of attachment providing a more uniform moment of force on said lever regardless of weight of the lure or sinker.

12. Fishing equipment including a releasable line storing mechanism for use in troll fishing on a boat with a rod, reel, line and lure, for sailfish, marlin or the like, comprising in combination a spring tensioned lever swingably mounted on said mechanism with respect to said boat, a line clamping mechanism on said lever for holding the fishing line between the rod tip and the lure while the line is trolled, means for releasing said line clamping mechanism upon the swinging of said lever, and a line storing fixed spool associated with said line clamping mechanism for holding a length of line extending between the line clamping mechanism and the rod and reel, said line storing spool being adapted to be mounted with the axis of said spool extending in the direction of travel of said boat, a spinning type mechanism for winding said length of line on said spool provided with a shaft extending through the axis of said spool, a releasable, rotatable line guide at the aft end of said shaft and an operating handle at the forward end of said shaft for winding the line on said spool, said line releasing means and clamping mechanism freeing the line from said spool in an axial direction without drag on the line when the line clamping mechanism on said lever releases the line upon the swinging of the lever by the tension on the line caused by a fish taking the lure, thereby permitting the fish to be hooked, played and retrieved with the line free of said lever and rod and line storing mechanism.

References Cited in the file of this patent

UNITED STATES PATENTS

| | | |
|---|---|---|
| 748,884 | Reichardt | Jan. 5, 1904 |
| 2,749,648 | Schneider | June 12, 1956 |
| 2,890,004 | Whitbeck | June 9, 1959 |